United States Patent [19]

Kohari et al.

[11] Patent Number: 5,027,680
[45] Date of Patent: Jul. 2, 1991

[54] MACHINE TOOL WITH TWO SPINDLES

[75] Inventors: Katsuo Kohari, Tachikawa; Shinichi Kono; Hironobu Takahashi, both of Oshino, all of Japan

[73] Assignee: Fanuc Ltd., Yamanashi, Japan

[21] Appl. No.: 415,294

[22] PCT Filed: Feb. 21, 1989

[86] PCT No.: PCT/JP89/00170
§ 371 Date: Sep. 25, 1989
§ 102(e) Date: Sep. 25, 1989

[87] PCT Pub. No.: WO89/08533
PCT Pub. Date: Sep. 21, 1989

[30] Foreign Application Priority Data

Mar. 9, 1988 [JP] Japan .................................. 63-055766

[51] Int. Cl.⁵ .............................................. B23B 3/00
[52] U.S. Cl. ....................................... 82/1.11; 82/129; 82/118
[58] Field of Search ................ 82/1.11, 129, 159, 118, 82/117

[56] References Cited

U.S. PATENT DOCUMENTS

| 4,457,193 | 7/1984 | Matthey | 82/159 |
| 4,683,787 | 8/1987 | Link | 82/117 |
| 4,719,676 | 1/1988 | Sansone | 82/124 |
| 4,827,814 | 5/1989 | Wilkins | 82/1.1 |
| 4,934,882 | 6/1990 | Phillips | 51/281 C |

Primary Examiner—Frederick R. Schmidt
Assistant Examiner—Lawrence Cruz
Attorney, Agent, or Firm—Staas & Halsey

[57] ABSTRACT

The invention relates to a machine tool having two spindles driven and controlled by servomotors (1), (2) by supplying velocity control circuits (3), (4) with velocity commands (Vcmd₁), (Vcmd₂) for independently controlling the rotational velocities of first and second spindles. The spindles of a machine tool such as a lathe are controlled for synchronous operation so that the two spindles can be controlled in order to machine a workpiece efficiently. According to the invention, synchronous operation is executed efficiently upon achieving coincidence between the rotational angles of the spindles so that a workpiece can be regripped during rotation.

2 Claims, 3 Drawing Sheets

MACHINE TOOL WITH TWO SPINDLES

BACKGROUND OF THE INVENTION

1. Technical Field

This invention relates to a machine tool having two spindles and, more particularly, to a method of controlling simultaneous operation of the spindles of a machine tool such as a lathe adapted to control two spindles in order to machine a workpiece efficiently.

2. Description of the Related Art

The machine tool of a multiple-spindle head unit is widely employed to realize a shorter piece time when machining workpieces. As is seen in an NC lathe, by way of example, two or more spindles are provided for each tool rest, and the spindles are controlled by independent spindle motors to shorten the time needed for mounting and unmounting workpieces. Alternatively, the flexibility with which workpieces are machined is enhanced by spindle motors having different functions.

When workpieces are regripped at a plurality of spindles, the same velocity command is applied to each spindle motor and, when the velocities coincide, a transition is made to the next machining operation without stopping the workpiece, which is in the rotating state.

With the conventional machine tool in which two spindles are disposed to oppose each other on the same axis and a tool rest is capable of machining the workpiece at either spindle, it is required that the velocities of both spindles coincide reliably at workpiece regripping. If this is not achieved, the workpiece may be damaged by a chuck or is in danger of being deformed. When the spindle motors differ, however, it is difficult to bring their rotational velocities into perfect coincidence. In addition, owing to the load, the rotational velocities fluctuate even though the velocity commands are the same.

Furthermore, with conventional control for synchronous spindle operation, the rotational angular positions of both spindles do not readily coincide even if the velocities can be made to coincide, and it is difficult to correct for a deviation in chuck meshing position.

SUMMARY OF THE INVENTION

The present invention has been devised in order to solve the foregoing problems and its object is to provide a machine tool having two spindles, in which synchronous operation is performed reliably upon achieving coincidence between the rotational angles of the spindles.

In accordance with the invention, there is provided a machine tool having two spindles in which rotational velocity of a first spindle is made to coincide with rotational velocity of a second spindle and a workpiece is transferred between the spindles, comprising command means for supplying respective velocity controllers of the first and second spindles with identical velocity commands, mode setting means for cutting off the velocity command to the velocity controller of the second spindle and setting an operation control mode for synchronizing the second spindle with the first spindle, arithmetic means for computing a position error related to rotational angles of the first and second spindles in the synchronous operation control mode, and correcting means for correcting the velocity command to the velocity controller of the second spindle in such a manner that a detected position error becomes zero.

Further, in accordance with the invention, there is provided a spindle synchronous operation control method for applying synchronous operation control to first and second spindles having mutually independent velocity control circuits, characterized by having a first step of bringing velocity commands to the first and second spindles into coincidence, a second step of detecting actual velocity and rotational angular position of each spindle and computing an error between these velocities and an error between these positions, a third step of correcting one of the velocity commands by the computed velocity error, and a fourth step of correcting one of the velocity commands by the computed position error.

Thus, a machine tool having two spindles in accordance with the invention is such that the velocity error signal of the first and second spindles and the position error signal of the first and second spindles are each added to the velocity command of the second spindle to enable correction of this velocity command.

DETAILED DESCRIPTION OF THE PREFERRED EMBODIMENTS

An embodiment of the present invention will now be described in detail with reference to the drawings.

Figure 1:
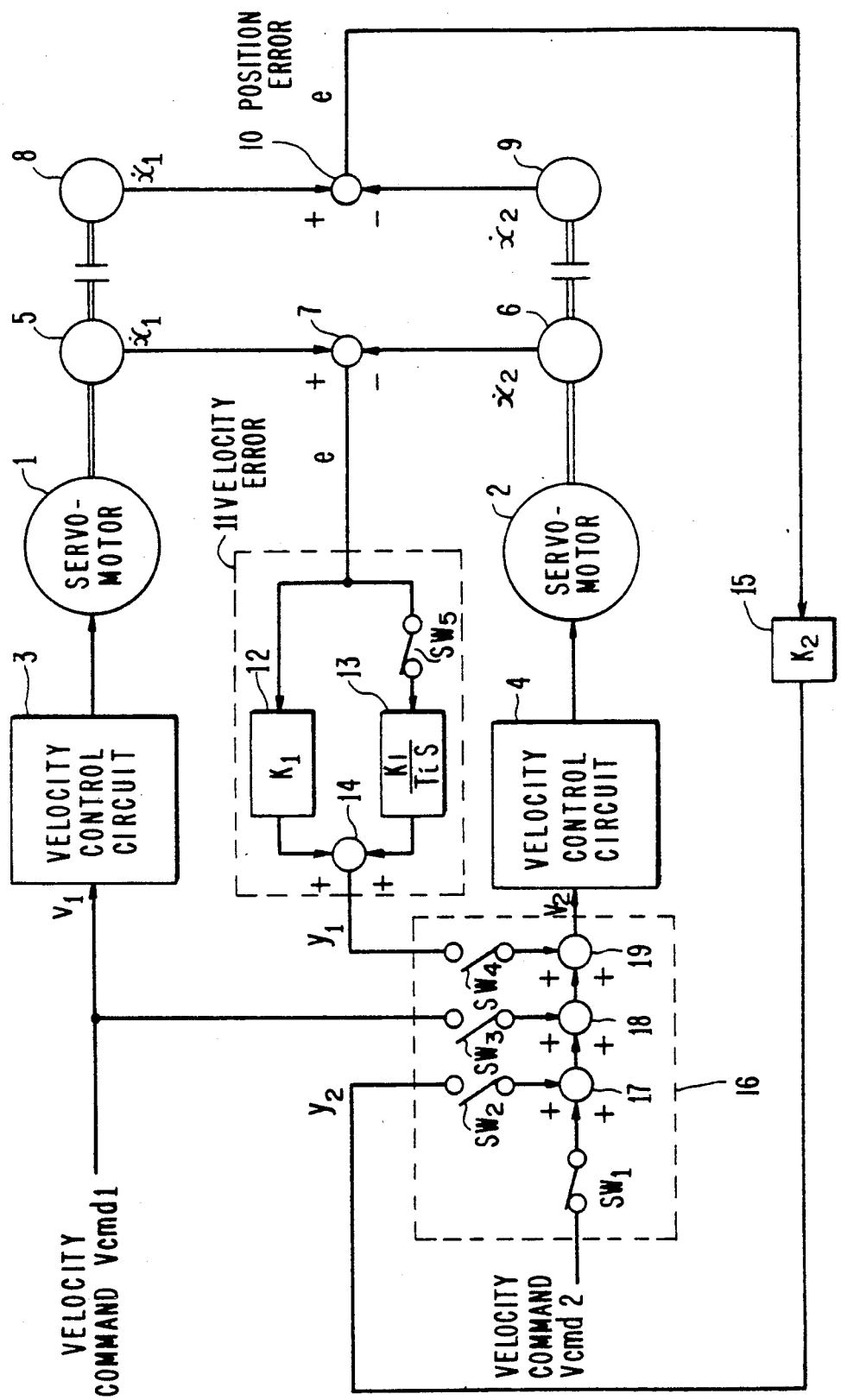
FIG. 1 is a schematic view of a system configuration illustrating an example of the velocity controller of a machine tool according to the invention.

FIG. 1 is a view of a system configuration illustrating an example of the velocity controller of a machine tool according to the invention.

Servomotors 1, 2, which are for rotating two spindles of a machine tool, are controlled to rotate at a predetermined velocity by current commands from velocity control circuits 3, 4, respectively. During ordinary operation, the velocity control circuits 3, 4 are provided with velocity commands Vcmd$_1$, Vcmd$_2$ for independently controlling the rotational velocities of the first and second spindles. Velocity and current feedback signals of the servomotors 1, 2 are also applied to the circuits 3, 4. The velocities of the servomotors 1, 2 when V$_1$, V$_2$ are applied to the velocity control circuits 3, 4 as commanded velocities are detected by respective velocity detectors 5, 6, and the results of detection are applied to an adder 7 as velocity data x$_1$, x$_2$, whereby a velocity error e is calculated.

Numeral 8 denotes a position detector of the first spindle. The detector detects rotational position data x$_1$ from the first spindle connected to the servomotor 1 at a gear ratio of 1:n. With regard to the second spindle, rotational position data x$_2$ are detected by a similar position detector 9. These position signals are outputted to an adder 10, where a positional error e is calculated.

Numeral 11 denotes a PI operation adjustment circuit constituting a velocity loop with respect to the velocity control circuit 4. Outputs of an amplifier block 12 comprising a proportional element (P) and a block 13 which includes an integration element (I) are added by an adder 14. Accordingly, with a switch mechanism SW$_5$ turned on, proportional integration data y$_1$ based on a velocity error e from the adder 7 are formed in accordance with the following equation by the PI operation adjustment circuit 11:

$$Y_1(s) = K_1[1 + (1/T_i s)]E(s)$$

where $K_1$ is integration gain and $T_i$ is a constant value corresponding to the time required for integration processing.

The velocity control circuit 4 constitutes also a position loop based on the positional error e from the adder 10. An amplifier block 15 whose proportional constant is $K_2$ is arranged within this position loop.

It is possible for the velocities $x_1$, $x_2$ to be determined by computation from amount of movement per unit time using the position detectors 8, 9.

The velocity command $Vcmd_2$ for one of the two spindles of the machine tool that is connected to the servomotor 2 is supplied to the velocity control circuit 4 via a mode changeover circuit 16. The latter comprises four switch mechanisms $SW_1$-$SW_4$ and three adders 17-19 for changing over the control mode. The velocity command $Vcmd_2$ enters the adder 17 via the switch mechanism $SW_1$. Also applied to the adder 17 via the switch mechanism $SW_2$ is an output $y_2$ of the amplifier block 15. The result of the addition performed by the adder 17 enters the next adder 18, to which is applied the velocity command $Vcmd_1$ via the switch mechanism $SW_3$. The proportional integration data $y_1$ from the PI operation adjustment circuit 11 is supplied to the adder 19 via the switch mechanism $SW_4$ to be added to the output of the adder 18, thereby forming the command velocity $V_2$ applied to the velocity control circuit 4.

Figure 2:
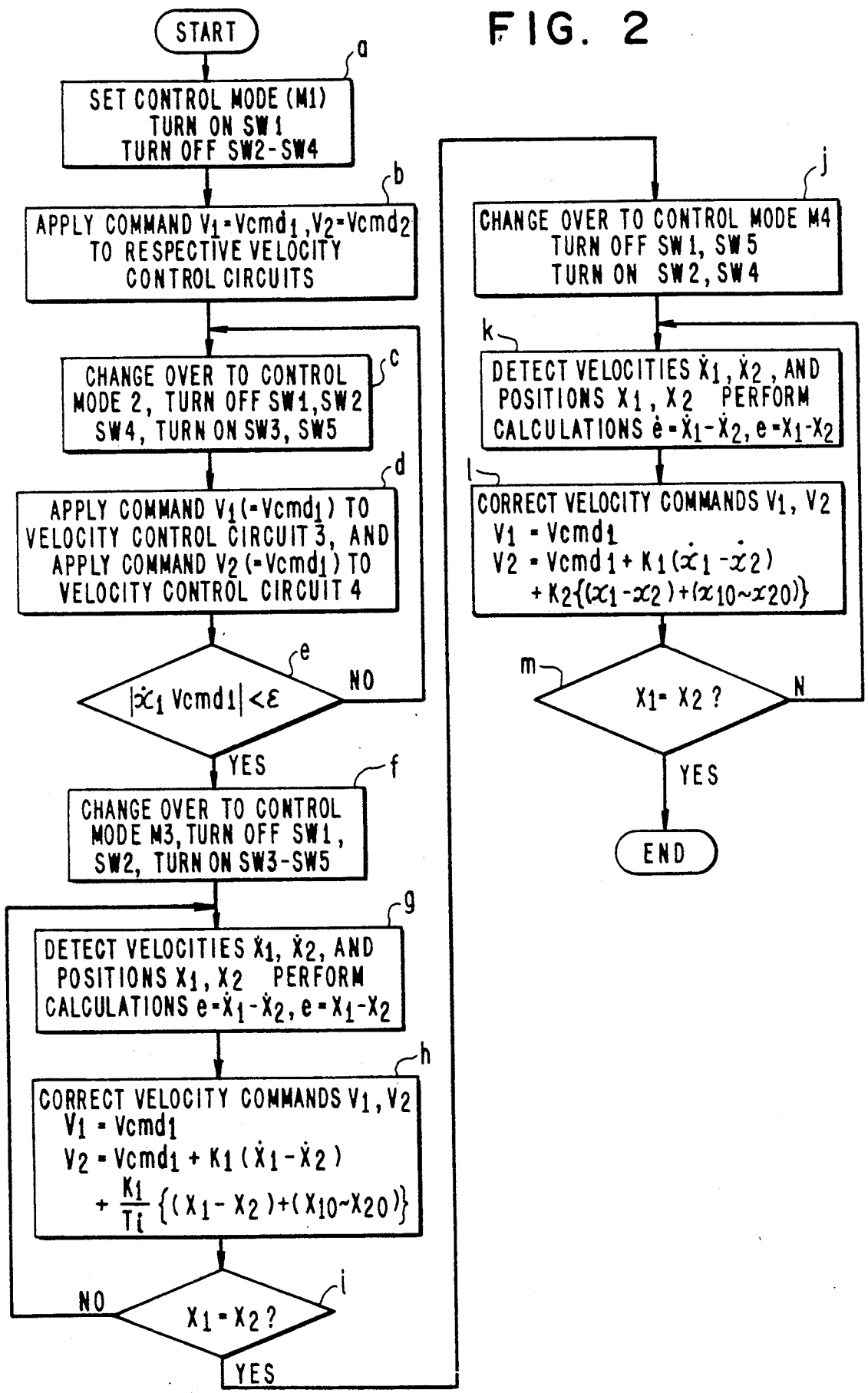
FIG. 2 is a flow chart illustrating the control flow of the above-mentioned machine tool system.

FIG. 2 is a view showing the control flow of the abovementioned machine tool system.

In a case where the rotational velocity of the first spindle is made to coincide with the rotational velocity of the second spindle and a workpiece is transferred between the two spindles, the first step is to set a control mode M1 (step a) for turning on $SW_1$ and turning off $SW_2$-$SW_4$ in the mode changeover circuit 16. This causes the velocity commands $Vcmd_1$, $Vcmd_2$ to be delivered to the velocity control circuits 3, 4 (step b).

Next, the control mode is switched from M1 to M2 by turning off $SW_1$, $SW_2$, $SW_4$ and turning on $SW_3$, $SW_5$ (step c), and $Vcmd_1$ is applied to the velocity control circuits 3, 4 (step d).

The command is applied until the absolute value of the difference between the detected velocity $x_1$ of the first spindle and $Vcmd_1$ approaches a predetermined value $\epsilon$ (step e).

Next, the control mode is switched from M2 to M3 by turning off $SW_1$, $SW_2$ and turning on $SW_3$ through $SW_5$, and the same velocity command is applied to both spindles (step f). As a result, control solely by means of the velocity loop starts, at which time the velocities $x_1$, $x_2$ and positions $x_1$, $x_2$ of the servomotor motors 1, 2 of the respective spindles are detected and the velocity error e calculated. The positions $x_1$, $x_2$ of the spindles are also calculated at this time (step g). In other words, the command velocity $V_1$ to the velocity control circuit 3 of the first spindle is applied as $$V_1 = Vcmd_1$$

and the velocity command $V_2$ to the velocity control circuit 4 of the second spindle is applied as $$V_2 = Vcmd_1 + K_1(x_1 - x_2)$$

$$+ (K_1/T_i)[(x_1 - x_2) + (x_{10} - x_{20})]$$

(step h) obtained by adding the commanded velocity $V_1$ of the first spindle applied to the velocity control circuit 3 and the proportional integration output $y_1$ obtained from the velocity deviation e. It should be noted that $x_{10}$, $x_{20}$ represent the offsets of the respective first and second spindles from the machine origin.

The velocity $V_2$ is repeatedly calculated at a predetermined computation cycle until the detected velocities $x_1$, $x_2$ of the two spindle motors coincide (step i). At coincidence, the control mode is switched from M3 to M4 by turning off $SW_1$, $SW_5$ and turning on $SW_2$-$SW_4$ (step j). In other words, the rotational velocity of the second spindle is subjected to control at the same time by the velocity loop and position loop. Next, the velocities $x_1$, $x_2$ and positions $x_1$, $x_2$ of the spindle servomotors 1, 2 are detected as in step d, and the velocity error e and position error are calculated (step k). That is, with the command velocity $V_1$ applied to the velocity control circuit 3 of the first spindle held at $$V_1 = Vcmd_1$$

the velocity $V_2$ applied to the velocity control circuit 4 of the second spindle is corrected as follows:

$$V_2 = Vcmd_1 + K_1(x_1 - x_2) + K_2[(x_1 - x_2) + (x_1 - x_2)]$$

obtained by adding the command velocity $V_1$ applied to the velocity control circuit 3 of the first spindle, the proportional output $y_2$ based on the position error e, and the proportional output $y_1$ obtained from the velocity error e (step l). The velocity $V_2$ is repeatedly computed at a predetermined computation cycle until the detected positions $x_1$, $x_2$ of the two spindles coincide (step m).

As a result of this series of processing steps, the spindles are reliably operated in synchronism with the rotational angles thereof in agreement. At the moment the velocities and positions of the two spindle motors coincide, a predetermined signal is generated to move the spindles and regrip the workpiece. The switch mechanisms $SW_1$-$SW_3$ of the mode changeover circuit illustrate the concept of control mode changeover. In actuality, they are constructed as electronic devices or formed as a control program in each servo processor. Accordingly, regardless of the spindle at which the workpiece is gripped, it is possible to achieve coincidence with regard to velocity and position.

Figure 3:
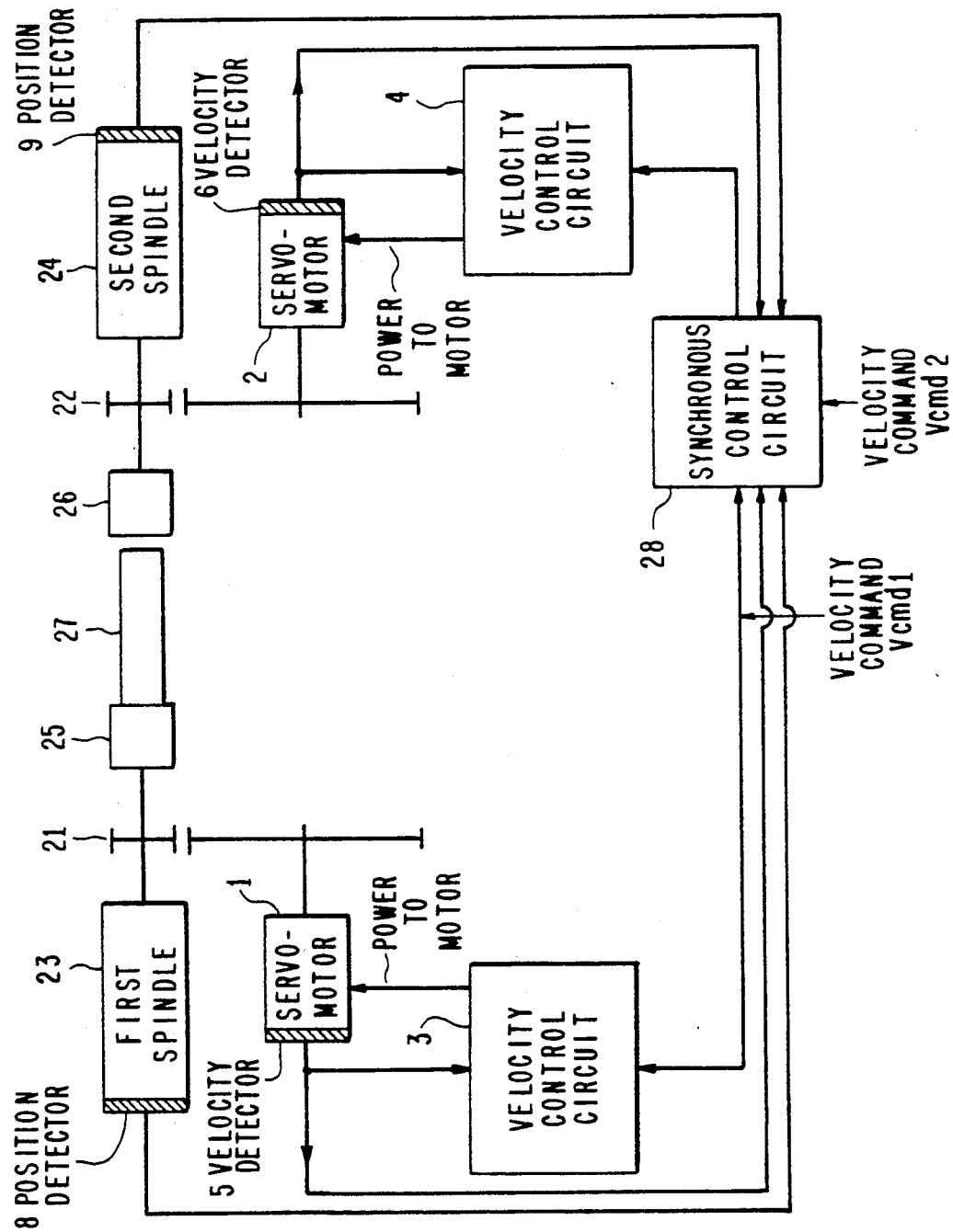
FIG. 3 is a schematic view illustrating an example of the construction of the machine tool mechanism for rotating first and second spindles.

FIG. 3 illustrates an example of the arrangement of a machine tool mechanism so adapted that the servomotors 1, 2 rotate a first spindle 23 and a second spindle 24 via respective gear mechanisms 21, 22. When a workpiece 2 held by a chuck 25 attached to the first spindle 23 is regripped by a chuck 26 on the side of the second spindle, the velocity commands for the velocity control circuits 3, 4 are corrected by the above-described control for synchronous spindle operation, whereby the accuracy of the synchronous velocities is enhanced to reduce the load on a workpiece 27 when the workpiece is transferred. Numeral 28 denotes a synchronous control circuit for controlling this synchronous operation of the spindles.

Though an embodiment of the present invention has been described, the invention is not limited thereto but can be modified in various ways without departing from the scope of the claims.

A machine tool having two spindles in accordance with the invention is such that synchronous operation is executed upon achieving coincidence between the rotational angles of the spindles, thereby allowing a workpiece to be regripped during rotation. As a result, labor in a cutting process can be reduced and machining time shortened without damaging workpieces.

We claim:

1. A machine tool having two spindles independently driven respectively by two servomotors in which rotational velocity of a first spindle is made to coincide with rotational velocity of a second spindle during transfer of a workpiece between two spindles, comprising:

command means for supplying respective velocity controllers of the servomotors of the first and second spindles with identical velocity commands;

mode setting means for setting a synchronous operation control mode for cutting off the velocity command to the velocity controller of the servomotor of the second spindle and synchronizing the second spindle with the first spindle;

arithmetic means for computing a position error related to rotational angles of the first and second spindles in the synchronous operation control mode; and correcting means for correcting the velocity command to the velocity controller of the servomotor of the second spindle in such a manner that a detected position error becomes zero.

2. A spindle synchronous operation control method for applying synchronous operation control to first and second spindles independently driven by two servomotors having mutually independent velocity control circuits, comprising:

a first step of bringing velocity commands to the servomotor of the first and second spindle into coincidence;

a second step of detecting actual velocity and rotational angular position of each spindle and computing an error between these velocities and an error between these positions;

a third step of correcting one of said velocity commands to one of the servomotors by the computed velocity error; and a fourth step of correcting one of said velocity commands to one of the servomotors by the computed position error.

* * * * *